(12) United States Patent
Veerasamy (10) Patent No.: US 9,956,752 B2
(45) Date of Patent: May 1, 2018

(54) METHODS OF MAKING LAMINATED LED ARRAY AND/OR PRODUCTS INCLUDING THE SAME

(71) Applicant: Guardian Glass, LLC, Auburn Hills, MI (US)

(72) Inventor: Vijayen S. Veerasamy, Ann Arbor, MI (US)

(73) Assignee: Guardian Glass, LLC, Auburn Hills, MI (US)

( * ) Notice: Subject to any disclaimer, the term of this patent is extended or adjusted under 35 U.S.C. 154(b) by 86 days.

(21) Appl. No.: 13/644,458

(22) Filed: Oct. 4, 2012

(65) Prior Publication Data
US 2014/0096893 A1 Apr. 10, 2014

(51) Int. Cl.
*B32B 37/14* (2006.01)
*B32B 17/10* (2006.01)
(Continued)

(52) U.S. Cl.
CPC ........ *B32B 37/14* (2013.01); *B32B 17/10541* (2013.01); *B32B 17/10559* (2013.01);
(Continued)

(58) Field of Classification Search
CPC ........ B32B 17/10036; B32B 17/10541; B32B 17/10376; B60Q 1/2696; F21S 48/215;
(Continued)

(56) References Cited

U.S. PATENT DOCUMENTS 5,066,112 A 11/1991 Lynam et al.
5,241,457 A * 8/1993 Sasajima et al. ............. 362/503
(Continued)

FOREIGN PATENT DOCUMENTS

CN 102007616 A 4/2011
DE 195 07 234 9/1996
(Continued)

OTHER PUBLICATIONS

U.S. Appl. No. 13/644,396, filed Oct. 4, 2012; Veerasamy.
(Continued)

*Primary Examiner* — Jeffry H Aftergut
(74) *Attorney, Agent, or Firm* — Nixon & Vanderhye P.C.

(57) ABSTRACT

In certain example embodiments, light emitting diodes (LEDs) may be disposed on a deformable and flexible backbone sheet and chained together in an array, e.g., via flexible wiggle wires. Such flexible wiggle wires may also provide an electrical connection to an external power source. An optical out-coupling layer stack (OCLS) system may help serve as an index matching layer, heat sink, étendue conserver, etc. The backbone may be formed to a shape tailored to its ultimate application. Applications may include, for example, automotive (such as Center High Mounted Stop Lamp (CHMSL) applications), lighting, signage, and/or other applications. In an example CHMSL application, the deformable sheet with the LED array thereon has a step, sinusoidal, or other shape matched to the angle and/or curvature of the glass such that the LEDs produce light primarily in a direction parallel to a surface on which a vehicle is located.

23 Claims, 6 Drawing Sheets

(51) Int. Cl.
*F21S 8/10* (2006.01)
*B60Q 1/26* (2006.01)
*B60Q 1/30* (2006.01)

(52) U.S. Cl.
CPC .. *B32B 17/10568* (2013.01); *B32B 17/10761* (2013.01); *B60Q 1/268* (2013.01); *B60Q 1/2696* (2013.01); *B60Q 1/302* (2013.01); *F21S 48/211* (2013.01); *F21S 48/212* (2013.01); *F21S 48/215* (2013.01); *F21S 48/217* (2013.01); *F21S 48/22* (2013.01); *Y10T 156/10* (2015.01)

(58) Field of Classification Search
CPC ............. F21S 48/218; H05K 1/0306; H05K 2201/10106
USPC ......... 156/101, 99; 362/249.02, 311.02, 503, 362/800
See application file for complete search history.

(56) References Cited

U.S. PATENT DOCUMENTS

| | | | |
|---|---|---|---|
| 5,816,681 A | 10/1998 | Tedesco | |
| 6,371,637 B1* | 4/2002 | Atchinson et al. | 362/555 |
| 6,383,571 B1 | 5/2002 | Mühlfriedel | |
| 6,910,779 B2 | 6/2005 | Abel et al. | |
| 7,400,439 B2 | 7/2008 | Holman | |
| 7,604,377 B2 | 10/2009 | Yu et al. | |
| 7,656,585 B1 | 2/2010 | Powell et al. | |
| 7,794,125 B2 | 9/2010 | Offermann et al. | |
| 8,044,415 B2 | 10/2011 | Messere et al. | |
| 8,192,051 B2 | 6/2012 | Dau et al. | |
| 8,545,030 B2 | 10/2013 | Anderson et al. | |
| 2004/0008106 A1 | 1/2004 | Konczal | |
| 2005/0111220 A1* | 5/2005 | Smith | 362/235 |
| 2005/0238857 A1* | 10/2005 | Day | 428/209 |
| 2006/0015013 A1 | 1/2006 | Gilard et al. | |
| 2006/0275599 A1 | 12/2006 | Lefevre | |
| 2007/0153543 A1 | 7/2007 | Xu et al. | |
| 2007/0217213 A1* | 9/2007 | Chang | B60Q 1/268 362/503 |
| 2007/0217231 A1* | 9/2007 | Ishii et al. | 363/21.01 |
| 2008/0079012 A1 | 4/2008 | Grote et al. | |
| 2008/0080181 A1 | 4/2008 | Yu et al. | |
| 2008/0205077 A1 | 8/2008 | Lenderink et al. | |
| 2009/0015736 A1 | 1/2009 | Weller et al. | |
| 2009/0051277 A1 | 2/2009 | Inoue et al. | |
| 2009/0103298 A1 | 4/2009 | Boonekamp et al. | |
| 2009/0175047 A1 | 7/2009 | Tsai | |
| 2009/0278139 A1* | 11/2009 | Fjelstad | 257/88 |
| 2010/0060821 A1 | 3/2010 | Wang et al. | |
| 2011/0171764 A1 | 7/2011 | Toonen et al. | |
| 2012/0088319 A1 | 4/2012 | Veerasamy et al. | |

FOREIGN PATENT DOCUMENTS

| | | |
|---|---|---|
| EP | 0 495 685 | 7/1992 |
| TW | M413800 | 10/2011 |
| WO | WO 2004/009349 | 1/2004 |
| WO | WO 2007/085599 | 8/2007 |
| WO | WO 2008/007297 | 1/2008 |
| WO | WO 2009/102201 | 8/2009 |
| WO | WO 2012/047254 | 4/2012 |
| WO | WO 2012/047255 | 4/2012 |
| WO | WO 2012/047263 | 4/2012 |
| WO | WO 2012/047288 | 4/2012 |

OTHER PUBLICATIONS

U.S. Appl. No. 13/644,567, filed Oct. 4, 2012; Frey et al.
U.S. Appl. No. 13/188,916, filed Jul. 22, 2011; Veerasamy et al.
Spectrum Scientific Diffraction Grating Definitions [retrieved Jul. 31, 2012]. http://www.ssioptics.com/definitions.html.
Keyence America. Fiber Laser Technology: MD-F3000 Series 3-Axis Fiber Laser Marker [retrieved Oct. 3, 2012]. http://www.keyence.com/products/marker/lasermarker/mdf3000/mdf3000_features_1.php.
International Search Report dated Jan. 2, 2014.
Search Report dated May 23, 2017 for TW Application No. 102135849.

* cited by examiner

METHODS OF MAKING LAMINATED LED ARRAY AND/OR PRODUCTS INCLUDING THE SAME

Certain example embodiments relate to light emitting diode (LED) systems, and/or methods of making the same. More particularly, certain example embodiments relate to laminated LED arrays, products including such laminated LED arrays, and/or methods of making the same. In certain example embodiments, LEDs may be disposed on a flexible backbone sheet and chained together in an array. The backbone may be formed to a shape tailored to its ultimate application.

BACKGROUND AND SUMMARY OF EXAMPLE EMBODIMENTS OF THE INVENTION

Light emitting diodes (LEDs) have emerged as a technology used in general illumination, display, signage and other applications. There have been some attempts to improve luminous efficacy, CRI matching, and lifetimes, although there remains room for yet further improvements. Furthermore, challenges still exist when it comes to providing cost-effective techniques for integrating the active materials into device packages, interconnecting them into modules, managing the accumulation of heat during their operation, spatially directing and homogenizing their light output at desired levels of chromaticity and intensity, etc.

Some current commercial implementations make use of sophisticated, high-speed tools that are based on conceptually old procedures that exploit robotic systems to assemble material mechanically diced from a source wafer, with collections of bulk wires, lenses, and heat sinks in millimeter-scale packages, on a device-by-device basis, followed by separate steps to form arrays of the LEDs on rigid printed circuit boards (PCBs). However, these solutions tend to be proprietary and tailored to specific applications.

Thus, it will be appreciated that there is a need in the art for improved LED-inclusive devices, and/or methods of making the same. For example, there is a need in the art for improved LED-inclusive devices, and/or methods of making the same, where LED-inclusive subassemblies can be incorporated into a wide variety of different applications where different structural and performance requirements must be met and/or where conventional interconnections might otherwise be difficult.

In certain example embodiments of this invention, a window for a vehicle. First and second glass substrates are laminated to one another via a first laminating material. A deformable backbone supports a plurality of LED devices, with the deformable backbone being disposed between the first and second substrates, and with the LED devices being connected to one another via flexible wires. The backbone has a shape selected to match an angle at which the windshield is to be disposed in the vehicle and so that the LED devices, when powered, emit light primarily in a direction parallel to a surface on which the vehicle is located.

In certain example embodiments of this invention, an electronic device. A flexible sheet supports a plurality of a bare die LEDs. The LEDs are connected to one another via flexible wires to form an LED array. The LEDs in the array are individually addressable and powerable via remotely located control circuitry. An optical out-coupling layer stack (OCLS) system is disposed over the LEDs, with the OCLS system comprising an isotropic layer matrix including an organo-metallic chelate hybrid material and a matrix core including dispersed scatterers. The flexible sheet is deformed, with the LED array thereon, such that is shaped to match a desired application.

In certain example embodiments of this invention, a method of making a window for a vehicle is provided. A deformable backbone supporting a plurality of LED devices is provided, with the LED devices being connected to one another via flexible wires. The deformable backbone with the LED devices thereon is positioned between first and second glass substrates. The first and second substrates are laminated together with the deformable backbone therebetween. The backbone, when laminated between first and second substrates, has a shape selected to match an angle at which the windshield is to be disposed in the vehicle and so that the LED devices, when powered, emit light primarily in a direction parallel to a surface on which the vehicle is located.

In certain example embodiments of this invention, a method of making an electronic device is provided. A flexible sheet supporting a plurality of a bare die LEDs is provided, with the LEDs being connected to one another via flexible wires to form an LED array, and with the LEDs in the array being individually addressable and powerable via remotely located control circuitry. An optical out-coupling layer stack (OCLS) system is disposed over the LEDs, with the OCLS system comprising an isotropic layer matrix including an organo-metallic chelate hybrid material and a matrix core including dispersed scatterers. The flexible sheet is deformed, with the LED array thereon, such that is shaped to match a desired application.

The features, aspects, advantages, and example embodiments described herein may be combined in any suitable combination or sub-combination to realize yet further embodiments.

BRIEF DESCRIPTION OF THE DRAWINGS

These and other features and advantages will be better and more completely understood by reference to the following detailed description of exemplary illustrative embodiments in conjunction with the drawings, of which.

DETAILED DESCRIPTION OF EXAMPLE EMBODIMENTS OF THE INVENTION

Certain example embodiments relate to techniques for incorporating LED devices into lighting modules that manage light conversion, extraction and distribution in ways that (i) allow packaging in unique form-factors such as complex multi-axial bends, (ii) reduce adverse effects related to heat build-up during operation, (iii) wavelength convert and improve light out-coupling efficiencies, and/or (iv) distribute light in desirable spatial orientations. This is accomplished in certain example embodiments by decoupling LED devices into its various components including, for example, (i) bare dice, (ii) phosphors, and (iii) optical element arrays and out-coupling scatterers.

The above-described and/or other problems could be solved, in part, by provided stretchable LED array based circuits that can conform to the shape of a substrate or superstrate and can be readily deformable, while still maintaining their functionality. Such assemblies could be useful in a variety of applications, including those that involve electronic components distributed over a comparatively large area such as, for example, displays and discrete LEDs used in signage applications, sensor arrays, etc. Thus, certain example embodiments involve a mesh of electronics components with the following example attributes:

- Simple flexibility implies single or uni-axial bends (so as to provide, e.g., cylindrical and/or conical shapes).
- Flexibility as well as stretchability implies complex or multi-axial bends and/or arbitrary shapes, if the conducting interconnects are also stretchable.
- The mesh is patternable into islands. Electrical components may be distributed on small islands of a PCB (that may, for example, include heat sinks and thus allow the meshes to be in close proximity to or in contact with a supporting glass substrate).
- Combinability with stretchable optics, which may help allow for the embedding of optical fibers and polydimethylsiloxane (PDMS) and/or other stretchable optical waveguides in stretchable substrates (e.g., for artificial skin, pressure-touch, shear, and/or other sensor applications).
- Various domains of the above can be interconnected with transparent conductive coating (TCC) interconnects (which may be transparent conductive oxides or TCOs, or the like) or potentially pre-patterned bus bars on the glass. Conductive inks of or including silver and/or carbon may be used in conjunction with low temperature solders, at least with respect to the later.
- The mesh may be laminated between two sheets of glass using PVB, EVA, or any laminable medium.
- The laminated foil or substrate may be provided with three-dimensional relief structures or embossed with a view of directing the active components in certain desirable orientations about a certain axis.
- The mesh may include a laminable flexible solar cell (e.g., a CIGS, c-Si, and/or other based solar cell, optionally on a metal foil), and a thin battery. The solar cell may charge the battery, which is electronically regulated to power the active components (e.g., in connection with LEDs used in signage applications). In such instances, the device may be free from external leads and/or power connections and, as a result, may be a part of an autonomous system.

Thus, certain example embodiments may include a flexible circuit including small islands of rigid small distributed PCBs, with stretchable interconnects. The islands themselves may be either rigid or semi-flexible and may include electrical components (e.g., passive and/or active electrical components such as, for example, diodes, regulator chips, antennas, energy transformer elements, etc). Wiggle wire technology may be used in the design of stretchable, highly-reliable interconnects. The whole unit may be encapsulated or cladded in a strain-allowing material such as, for example, PDMS, other silicones, and/or other suitable materials.

Figure 1:
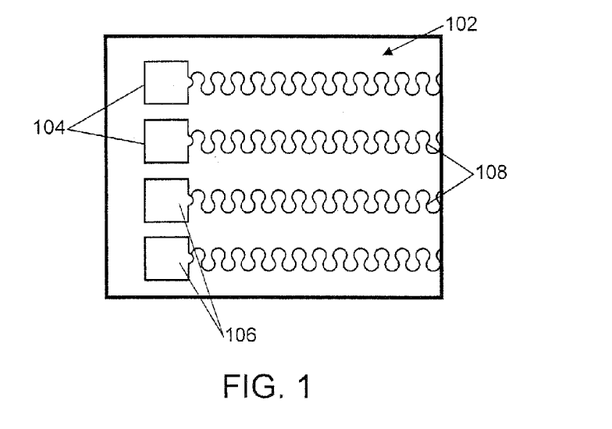
FIG. 1 shows a polyimide base supporting component islands and helping to protect the straight tracks and soldered joints from strains, in accordance with certain example embodiments.

Referring now more particularly to the accompanying drawings in which like reference numerals indicate like parts throughout the several views, FIG. 1 shows a polyimide base 102 supporting component islands 104 and helping to protect the straight tracks and soldered joints 106 from strains, in accordance with certain example embodiments. That is, the polyimide base 102 may, for example, help support stretchable copper conductors, while wiggle wires 108 enable component and meander support.

Figures 2A, 2B:
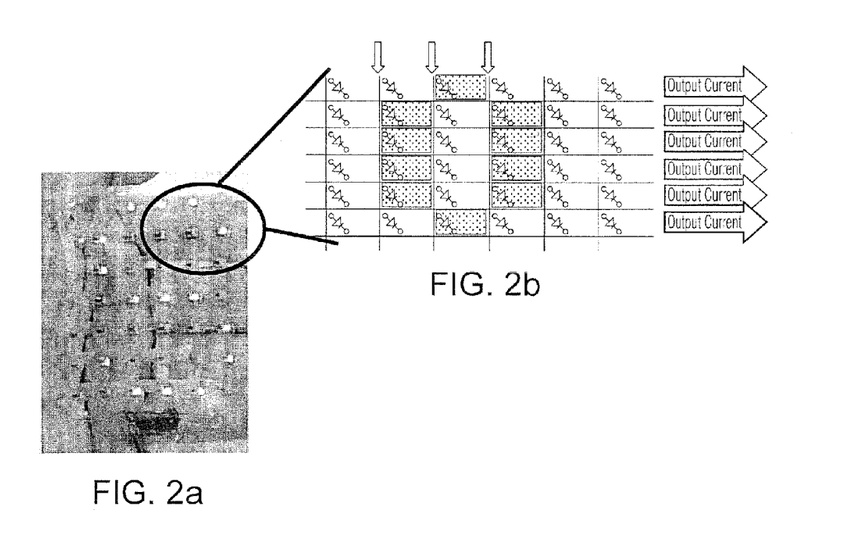
FIG. 2a is an image of a stretchable and flexible mesh including a two-dimensional array of LEDs placed in a passive matrix that is selectively addressable, in accordance with certain example embodiments.
FIG. 2b is a schematic view of the FIG. 2a mesh.

FIG. 2a is an image of a stretchable and flexible mesh including a two-dimensional array of LEDs placed in a passive matrix that is selectively addressable, in accordance with certain example embodiments, and FIG. 2b is a schematic view of the FIG. 2a mesh. In the FIG. 2a example, a power connection is provided at the periphery of the substrate, and signals are carried via a suitable TCO provided to the flexible carrier material. As will be appreciated by those skilled in the art, the mesh material may be laminated between glass and/or plastics. Sequenced addressing of select rows and/or columns may be used in applications such as, for example, signage, low resolution display, and/or the like.

One possible application for the techniques described above relates to automotive applications where the substrates are curved glass substrates and, more particularly, relates to the using an LED array in connection with a Center High Mounted Stop Lamp (CHMSL) in a rear windshield or backlite. Because of the inclination of the backlite, the luminous flux of an LED array would be not be optimized in the direction parallel to the road. That is, because LEDs are generally point light sources, the light may be directed upward, away from the direction parallel to the road, and at an angle generally matching the inclination of the backlite. One possible way to address this issue would be to increase the number of LEDs to match the desired or specified radiance in the direction of road. However, this solution is not efficient. By contrast, redirecting the light using conventional secondary non-imaging optics may be performed in connection with a gap, but the gap usually will need to be thicker that the thickness of the windshield or backlite.

Figure 3:
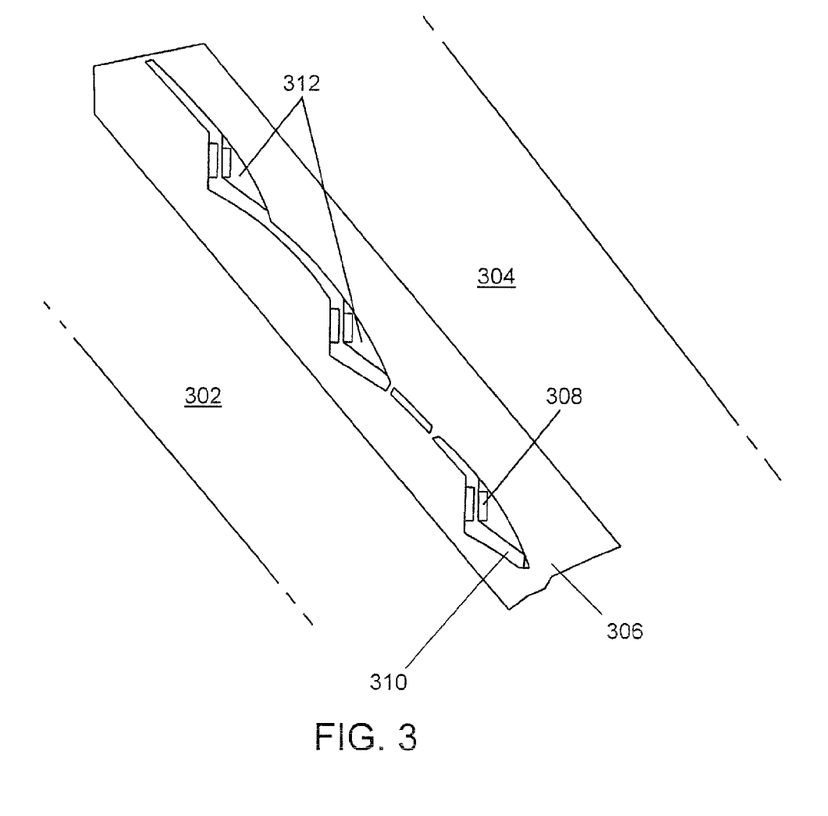
FIG. 3 is a cross-sectional view of a backlite in an area proximate to the Center High Mounted Stop Lamp (CHMSL) and through a section including LEDs, in accordance with certain example embodiments.

The inventor of the present disclosure has realized, however, that the use of conformable stretchable circuits and structures, or embossing of the PVP or glass itself, may allow light to be redirected in the most efficient manner. In this regard, FIG. 3 is a cross-sectional view of a backlite in an area proximate to the CHMSL and through a section including LEDs, in accordance with certain example embodiments. FIG. 3 includes inner and outer glass substrates sandwiched together via a polymer-inclusive interlayer 306, which may be PVB, EVA, or any other suitable material. LEDs 308, which are provided on a flexible backbone 310, are strung together and interconnected as a part of an array. The LEDs may have leads coming out of each other to facilitate connections to each other and/or connections to a power source. The backbone 310 itself may be bent or otherwise shaped into a step-like pattern that matches the inclination of the backlite, e.g., so as to facilitate light from the LEDs 308 being directed outward and in a direction that is substantially parallel to the road. An optional optical matching material 312 is provided in the stepped areas. This optical material 312 may be an optical out-coupling matrix material that optionally includes a light scattering matrix. This helps create a lens effect, e.g., with substantially collimated light bundles with smaller angular distribution at the exit of the lens. In certain example embodiments, the angular distribution is preferably 1-50 degrees, more preferably 4-40 degrees, and most preferably 10-30 degrees. The lens material may include PMMA, as I can be cast with a very high optical surface finish and has a reduced susceptibility to the common yellowing problem experienced by other materials after exposure to UV.

Figure 4:
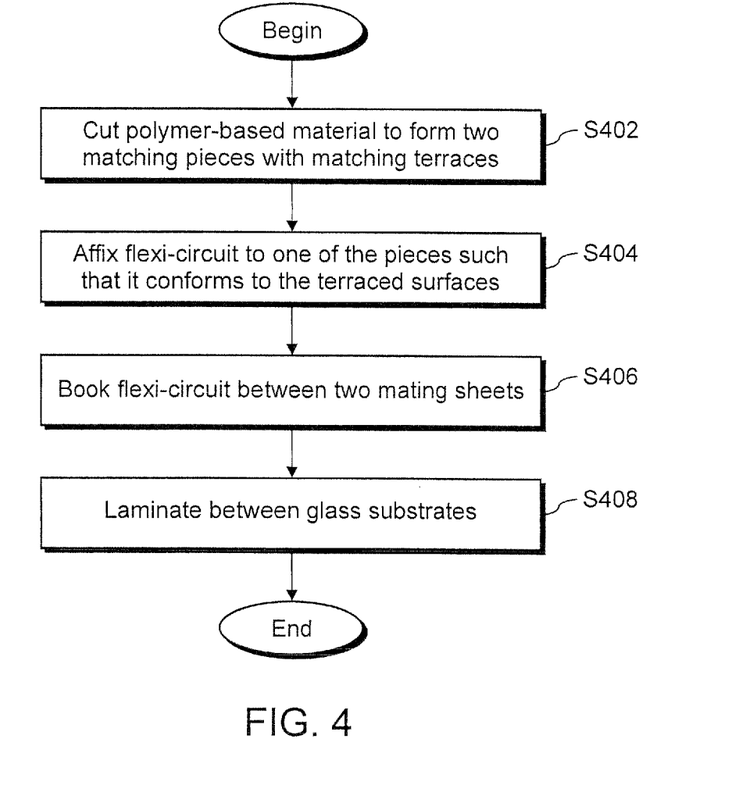
FIG. 4 is a flowchart illustrating one example technique for forming a CHMSL in accordance with an example embodiment.

The example CHMSL shown in FIG. 3 can be fabricated in a number of different ways. For instance, FIG. 4 is a flowchart illustrating one example technique for forming a CHMSL in accordance with an example embodiment. The material typically used for the polymer-inclusive interlayer in windshields (e.g., PVB, EVA, or the like) can be cut transversely in a potentially stepped or terraced manner, giving rise to two pieces of that material with jagged and matching faces (step S402). As an alternative, producing the multi-stepped wedge of PVB or other laminating material may be accomplished by extruding or other techniques, although this may be difficult to accomplish in connection with a molten polymer. A flexible circuit supporting micro-LEDs will be affixed to one of the pieces such that it conforms to the terraced surfaces (step S404). The flexible circuit may be booked between the two mating sheets (step S406). This sub-assembly may be laminated between two glass sheets (step S408).

It will be appreciated that other shapes may be used in lieu of the stepped or terraced shape of the polymer-based wedge. For example, a substantially sinusoidal cross-section of the PVB or EVA interlayer may be used in connection with certain example embodiments. Angle tolerances for non-imaging applications generally will not be as stringent as for imaging applications (including, for example, head-up display or HUD applications). Generally, angles may be controlled in tenth of radians tolerances, e.g., such that a target angle does not deviate by more than 1 radian.

The wedge's stepped surface or angle(s) allows the backlite to re-direct the LED light towards the line of sight of drivers following behind. If coated with antireflective (AR) and/or a light out-coupling layer or even etched, the backlite may perform as an optical combiner, essentially combining reflections off outer and inner backlite glass surfaces and redirecting the light out towards the viewer.

Figure 5:
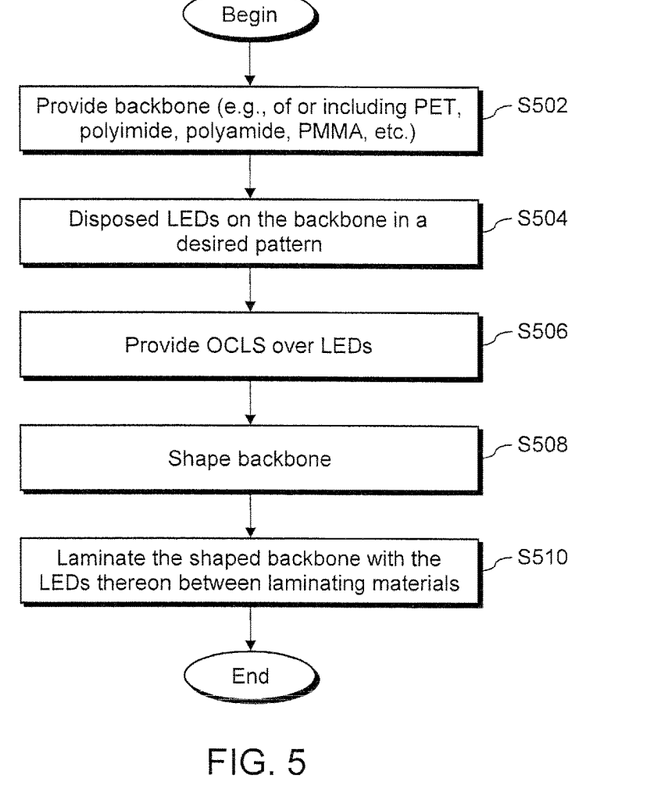
FIG. 5 is a flowchart illustrating another example technique for forming a CHMSL in accordance with an example embodiment.

FIG. 5 is a flowchart illustrating another example technique for forming a CHMSL in accordance with an example embodiment. A suitable backbone is provided in step S502. The backbone may be polymer-based in certain example embodiments and, in this regard, may be of or include PET, polyimide, polyamide, PMMA, etc. LEDs are disposed on the backbone in a desired pattern in step S504. An optical out-coupling layer stack (OCLS) system may be coated over the LEDs, or applied as a sheet thereon, in step S506. The backbone may be bent into shape in step S508. In step S510, the shaped backbone with the LEDs thereon may be laminated between laminating materials (which may be of or include PVB, EVA, or other suitable material), before or when the glass sheets bonded together. For instance, in certain example embodiments, a shaped backbone with LEDs provided thereon may be laminated, and the laminated sub-assembly may be sandwiched between the glass substrates (thereby effectively involving multiple separate laminating steps). In certain other example embodiments, the backbone may be sandwiched between the substrates, and the substrates may be laminated together with the backbone therebetween in a single step.

To achieve an improved (and potentially optimum) geometry as well as physical dimensions, non-imaging techniques may be used to tailor surfaces that transform the light distribution of the LED. Thus, in still another approach, in certain example embodiments, a simple cubic, hexagonal, or other shaped array of holes of potentially varying diameter(s) or major distances can be drilled into a laminating material (e.g., of or including PVB, EVA, or the like). An inner parabolic surface may be created and potentially coated with a reflective coating. For example, a mirror may be created using the wet process of silver mirroring. The mirror may be surface protected with a clear lacquer coating. The base glass may thus (i) provide the surface to create an array of compound parabolic concentration (CPC) holes, (ii) house the LED fully packaged or bare die PCB with optional ancillary heat sinks, (iii) house the lens, (iv) allow another glass plate carrying a phosphor to be remotely spaced far away from the LED, and/or perform other functions. See, for example, U.S. application Ser. No. 13/188,916, filed Jul. 22, 2011, the entire contents of which are hereby incorporated herein by reference. The '916 application describes how CPCs can be formed, e.g., to conserve the étendue of the light source; how a remote phosphor plate may be used with a Fresnel lens to provide increased diffusion and/or homogenization of emitted light; how mirror coatings may be formed and/or protected; etc. As is known, étendue refers to how spread out light is in a given medium over a given area and a solid angle. This difference may be up to, and sometimes over, a factor of 30 in conventional arrangements, and this difference might otherwise sometimes create barriers to achieving increased luminance on a target that is a given distance away from the plane of the light source. For example, a typical light source or lamp may only operate to collect 50% of the light emitted from the source.

Wiggle wires extending from the LEDs may extend to a power source. In certain example embodiments, this may be accomplished by disposing the LEDs and wiggle wires on a plot of silver-inclusive and/or other conductive ink. The wiggle wires may extend through the laminating material that protects the backbone (if any), e.g., to connect with the power source. In certain example embodiments, the wiggle wires may be in electrical communication with the power source via a conductive coating provided to one of the substrates. For instance, low-E coatings (which in some cases multilayer thin film silver-based layer stacks) may be disposed on one or more of the substrates. Because such low-E coatings generally are conductive, they may be used to power the LEDs. Other transparent conductive coatings (TCCs) may be used to power the LEDs, regardless of whether they are low-E coatings, in certain example embodiments.

Moreover, in certain example embodiments, the low-E or other conductive coatings may be patterned, e.g., to allow for remote program logic (potentially operating under the control of a processor, the vehicle's LIN bus, etc.) to control whether the lights should be activated, how they should be activated, etc. For instance, in certain example embodiments, a suitable hardware, software, and/or firmware controller may be used to cause the CHMSL to respond to breaking actions in known manners, to cause the light to change from color-to-color (or to shades of a single color) as breaking is taking place and potentially in proportion to how "hard" the driver is breaking, to cause messages to be displayed, etc.

Figure 6:
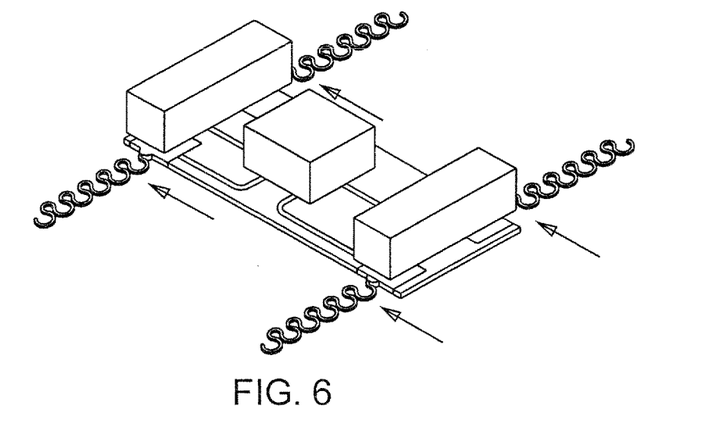
FIG. 6 shows an LED mounted on a semi-flexible board with wiggle wires extending therefrom, which may be used in connection with certain example embodiments.
Figure 7A:
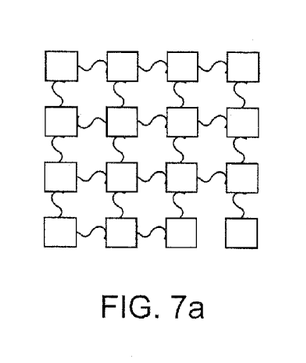
FIGS. 7a-7b show how LEDs of this sort may be connected in an array in accordance with certain example embodiments.
Figure 7B:
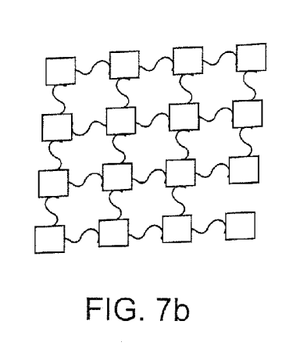

FIG. 6 shows an LED mounted on a semi-flexible board with wiggle wires extending therefrom, which may be used in connection with certain example embodiments. FIGS. 7a and 7b show how LEDs of this sort may be connected in an array in accordance with certain example embodiments. That is, FIGS. 7a-7b show a simple bare die LED array that is mountable on a semi-flexible board, with a serpentine-like interconnected mesh, in accordance with certain example embodiments.

As alluded to above, tailored profiles may be used to accurately transform the light of the source. But étendue efficiency is often only one of the consideration in the design of a collection lens. The presence of total internal reflection (TIR) at the reflecting surface, the need for or possibility to benefit from an antireflective coating, etc. can influence the usability of the devices of certain example embodiments.

Figure 8:
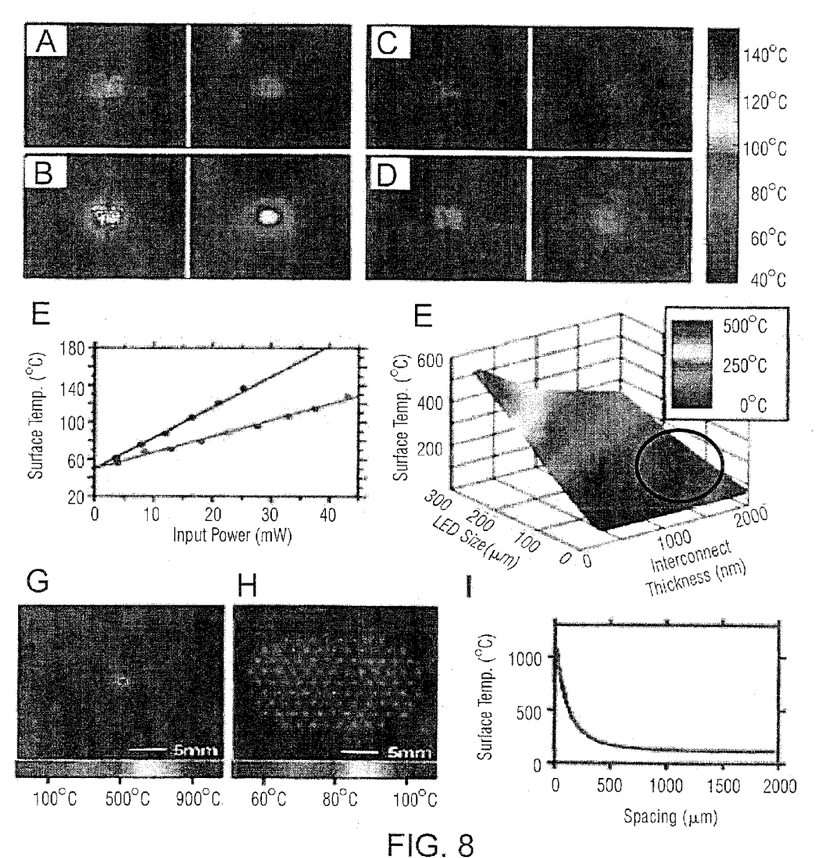
FIGS. 8A-8I are thermal management simulations that have been performed in connection with certain example embodiments.

Thermal considerations related to heat load also are a potential concern. In this regard, FIGS. 8A-8I are thermal management simulations that have been performed in connection with certain example embodiments. More particularly, FIGS. 8A-8D show temperature distributions for isolated InGaN μ-ILEDs with Al interconnects [300 nm and 1,000 nm thick for FIGS. 8A-8B and FIGS. 8C-8D), respectively] at input powers of 7.8 mW in FIG. 8A, 16.4 mW in FIG. 8B, 8.4 mW in FIG. 8C, and 18.0 mW in FIG. 8D, captured using a QFI Infra-Scope Micro-Thermal Imager (left) and calculated by analytical models (right). FIG. 8E shows the surface temperature for μ-ILEDs with Al interconnect thicknesses of 300 nm (darker line) and 1,000 nm (lighter line), extracted from experiments (dots), and computed using the analytical model (lines) as a function of input power. The input power used in FIG. 8E was 40 mW for each LED. FIG. 8F is a three-dimensional plot of the surface temperature as function of device size and interconnect thickness, at a constant heat flux of 400 W/cm$^2$. A preferred operation area is the encircled area, although other operation areas are usable in connection with different example embodiments. FIG. 8G shows the temperature distribution for a macro-sized LED (in this case, 1×1 mm$^2$), and FIG. 8H shows the temperature distribution for an array of 100μ-ILEDs (in this case, 100×100 μm$^2$) at a spacing of 2 mm. FIG. 8I shows μ-ILEDs surface temperature vs. spacing for an array of 100μ-ILEDs. The FIG. 8I graph is significant because it relates the surface temperature to ILED spacing. The maximum temperature of certain example embodiments preferably is less than 200 degrees C., more preferably below 175 degrees C., and most preferably below 100-140 degrees C. This is because efficiency drops as temperature increase. This implies a spacing of less than 500 μm, more preferably less than 400 μm, and still more preferably between about 200-375 μm.

Figure 9:
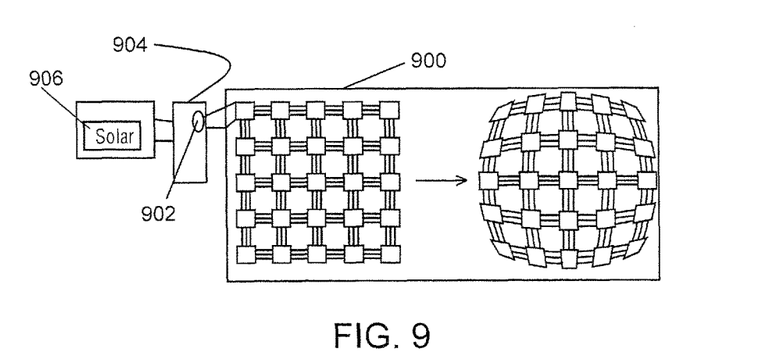
FIG. 9 is an electronic device that includes as energy harvester and power management electronics to make for an autonomous system in accordance with certain example embodiments.

FIG. 9 is an electronic device that includes as energy harvester and power management electronics to make for an autonomous system in accordance with certain example embodiments. The FIG. 9 device may be used in a wide variety of lighting applications, including vehicle lighting, signage, overhead or outdoor lighting, etc. As implied from FIG. 9, the stretchable LED matrix 900 may be deformed or otherwise included in a curved or planar embodiment. A driver chip 902 provided to a power management module 904 controls the functioning of individual LEDs in the LED matrix 900. The power management module 904 may receive and modulate power from one or more solar cells 906 or the like. A battery or the like (not shown) may be provided to store power generated by the solar cells 906, in certain example embodiments.

As alluded to above, one example application involves including a solar panel in a backlite or sunroof of an automobile. The solar module may supply enough power to run and charge a thin-film battery under ambient lighting conditions (e.g., greater than or equal to about 300 lux). The solar panel may run in parallel with a 5.6V zener overvoltage protection diode directly into a power management IC. As is known, a zener diode allows current to flow in the forward direction in the same manner as an ideal diode, but will also permit it to flow in the reverse direction when the voltage is above a certain value known as the breakdown voltage (the so-called zener voltage). The power IC may provide its outputs into a startup delay circuit to allow time for the solar panel to begin the charging process of an empty battery. The low quiescent current regulator (e.g., a TPS78033 module available from Texas Instruments) may help to keep the voltage passed from the solar panel in the operating voltage range needed to power a sensor or an array of LEDs.

Figure 10A:
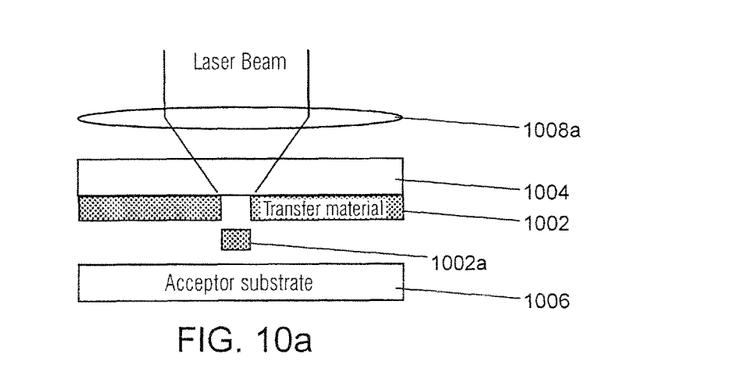
FIGS. 10a-10b demonstrate example patterning techniques that may be used in connection with certain example embodiments.
Figure 10B:
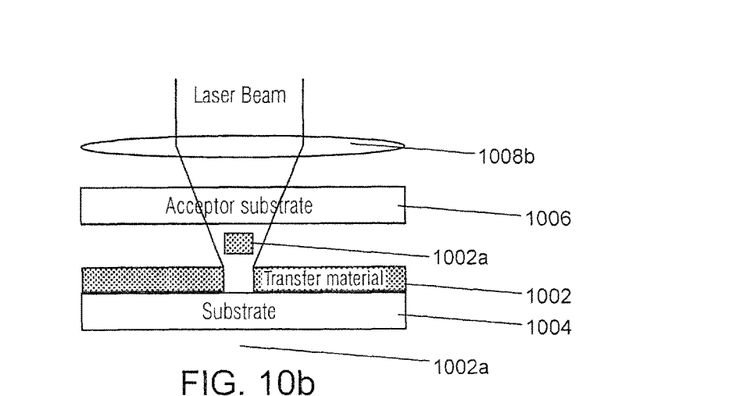

Patterning techniques may be used, for example, to pattern a conductive material disposed on the glass (e.g., a silver-inclusive material, an ITO-based layer, etc.) and/or form interconnects. Laser ablation, e.g., using a pulsed excimer laser or the like, is one technique that may be used in connection with certain example embodiments. FIGS. 10a-10b demonstrate example patterning techniques that may be used in connection with certain example embodiments. More particularly, FIG. 10(a) shows a LIFT technique, which involves laser-induced transfer of metal or other conductive portion 1002a from a layer of transfer material 1002 on an adjacent carrier glass or other substrate 1004 onto the receiving glass or other substrate 1006. The laser beam is focused through appropriate optics 1008a for accomplishing same. FIG. 10(b) shows the LIBT variant, in which a laser beam is irradiated through both suitable optics 1008b and the acceptor substrate 1006 to cause migration of the metal or other conductive portion 1002a from the layer of transfer material 1002 on adjacent carrier substrate 1004. Following such patterning, the LEDs can be connected by soldering (e.g., with a soldering iron) or any other suitable technique. The laser can also be used to make repairs when the array is partially or fully completed.

Although excimer lasers are mentioned above, other types of lasers can be used including, for example, YVO$_4$, YAH, Ti-sapphire, CO$_2$, and/or other lasers. As an example, suitable powers generally may be in the range of 10-20 W, Q-switched pulse frequencies may be in the range of 20-200 kHz, and the actual pulse width may be in the range of 100-140 ns. These example parameters allowed for quick processing and good mechanical/flexural durability. Higher power outputs (e.g., up to about 30 W) may allow for patterning to be performed on a potentially wider range of materials, with high speed marking (e.g., up to about 12,000 mm/s). The MD-F3000 model commercially available from Keyence, for instance, may be suitable for scribing ITO, CNT, silver bus bars, and/or other materials to link the LEDs to one another and/or to other data/power lines. Operating this apparatus at 70% power, with a scan speed of 1,000 mm/s at a frequency of 120 kHz and at a line width of 0.08 mm yielded good results, although other process parameters and/or equipment are of course possible in different implementations.

It is noted that the typical passenger car has an orientation of about 60 degrees (and oftentimes about 58 degrees). It will be appreciated that in certain example embodiments, the light output drop-off relative to the maximum output in certain example embodiments preferably is less than 25%, more preferably less than 15%, and even more preferably less than 10%, at angles up to 50 degrees off of normal. It also will be appreciated that in certain example embodiments, the light output increase relative to a situation where no redirection is employed at angles between about 40-60 degrees from normal is preferably at least about 25%, more preferably at least about 40%, and sometimes around 50% or even higher.

As indicated above, an OCLS system may help improve the output efficiency and heat sinking abilities of the assemblies. An OCLS may help to provide an index matching layer between the glass and LEDs, e.g., to help increase the light otherwise coupled into the glass. Mie-like scattering caused by the OCLS may help to frustrate the wave-guiding modes in the glass, e.g., by breaking down the in-phase coherence. In a related manner, Mie-like forward scattering may be increased, even with reduced spectral dispersion.

For example, $\Gamma_i(\Omega, k)$ can be defined as the photon flux incident to the glass surface, and $\Gamma_o(\Omega, k)$ can be defined as the output flux in air, where the symbols $\Omega$ and k are solid angle and wave vector, respectively. The ratio is now boosted by a factor $\eta_{iml} \times \eta_s (\Omega, k)$, where $\eta$ is the index matching efficiency of the OCLS matrix/adjacent planarizer and where $\eta_s$ is the scattering efficiency. The total flux output can the be calculated by computing the double integral $\iint \Gamma_i (\Omega, k) \eta_{iml} \times \eta_s (\Omega, k) \, d\Omega \, dk$ over the entire phase space. However, based on this model, one can see that the necessary condition is that the product $\eta_{iml} \times \eta_s > 1$. Certain example embodiments described below demonstrate how this regime can be implemented.

The OCLS may be a multilayer system in certain example embodiments, with its functionality being based at least in part on how its various components are optimized so as to achieve the desired performance. In certain example embodiments, the OCLS may include a thick isotropic layer matrix, with a matrix layer core that includes dispersed spherical scatterers, and an optional planarization layer. Each of these components is discussed in greater detail, below.

As indicated above, the OCLS may include a thick isotropic layer matrix, e.g., located between the glass and the LEDs. This layer may include an organo-metallic chelate hybrid with a high refractive index, preferably greater than 1.7, more preferably of 1.8-1.9, and potentially even higher in some cases. The absorption coefficient may be near zero in some cases. The chemistry of the matrix layer is described in, for example, U.S. Publication No. 2012/0088319, the entire contents of which are hereby incorporated herein by reference.

As the '319 publication describes, certain example embodiments may involve hybrid coating systems based on polymeric titanium dioxide and/or polymeric zirconia based systems. The organic-inorganic hybrid polymer solution is prepared by first reacting the titanium alkoxide with a chelating agent to convert the highly reactive tetra-coordinate titanium species to a less reactive hexa-coordinate species. Other desired polymer components may then be added to the stabilized titanium containing solution and thoroughly mixed. As a result of the stabilization, the hybrid polymer solution may be stable at room temperature up to 6 months with negligible change in color and viscosity. The hybrid polymer solution may be spin-coated or vertical slot coated onto substrates to a desired thickness.

A titanium dioxide rich film was generated by thermally decomposing the hybrid coatings at an elevated temperature of less than about 250 degrees C. The resulting dried films may be made as thin as 0.2 um and up to about 4 um or more. Such films may have good transparency and have refractive indices as high or higher than about 1.90 in the entire visible region when the cure temperature was 300 degrees C. or higher. A crack-free film over 300 nm in thickness was obtained with a single coating application. Multiple-coating is applicable to obtain a thicker film, and no apparent interface was seen from SEM cross-section images between two consecutive coatings. The hybrid high refractive index films are mechanically robust, stable upon exposure to both heat and UV radiation, and may be applicable for a wide variety of optical applications. The material is compatible with semiconducting material.

In certain example embodiments, the organic-inorganic hybrid polymer may be introduced into a laminable medium such as ethylene-vinyl acetate (EVA), silicones, aramids, etc. This would then allow the use of vacuum bonding or de-airing, sometimes without the use of autoclave.

The organic polymers chosen contained multiple hydroxy functionalities. They were so chosen to allow primary or secondary chemical bonding between the polymer and the titanium dioxide phase to promote phase compatibility and a high degree of dispersion. The chelated poly(dibutyl titanate) polymer and the organic polymer are compatible in all or substantially all proportions, both in solution and in the cured film, as evidenced by their high transparency and the refractive index dispersion curves. Typically, an index as high as or higher than 1.9 is obtained at 550 nm for a thickness of 0.4 um. When deposited on any inorganic light emitting diode, even a film as thin as 0.4 microns dramatically improves the light out-coupling from the high refractive index material significantly typically in the incremental range of 70%.

An inorganic-based precursor is provided. In certain example embodiments, the inorganic-based precursor may be a titanium-based precursor such as, for example, titanium alkoxide, a titanium-based phosphate complex, etc. The inorganic-based precursor may be deposited directly or indirectly on the device and/or substrate to be coated. For instance, in certain example embodiments, a titanium alkoxide based precursor may be deposited via atomic layer deposition (ALD), a titanium-based phosphate layer may be printed, etc. Of course, it will be appreciated that other high-index inorganic materials may be used in place of or in addition to the titanium in certain example embodiments.

A chelate may be formed, and an organic component may be added, together with optional additives. The chelate in certain example instances may be salicylic acid. The organic component in certain example embodiments may be a resin, silicone, polyimide, polyamide, and/or the like. Optional additives also may be introduced. For instance, other inorganic materials (e.g., in place of or in addition to the titanium-based precursor) may be introduced to tune the index of refraction. Indeed, the index of refraction may be adjusted upwardly or downwardly by selective inclusion of zirconia, silica and/or silicates, etc. Light scattering elements and/or heat dissipating elements also may be introduced. One example material that functions both as a lighter scattering agent and a heat dissipater is boron nitride. Plasticizers also may be included in certain example embodiments.

The chelated titanium-based precursor and the organic component(s) may be cross-linked to create an organic-inorganic hybrid solution. In one example, titanium alkoxide may be reacted with a chelating agent to convert the tetracoordinate Ti species into a less reactive hexa-coordinate species, e.g., to create chelated poly(dibutyl titanate). Of course, other titanates may be created and/or used in different embodiments of this invention. The hybrid polymer may result in certain example instances by mixing together the chelated poly(dibutyl titanate) with a hydroxy inclusive organic resin. In certain example embodiments, the organic and inorganic components may be provided in equal percentages by weight. In certain example embodiments, the organic and inorganic components may be provided in a ratio of 60/40 by weight. Of course, other ratios and/or percentages are possible in different embodiments of this invention.

The hybrid solution may be quite liquidous in certain example embodiments. In such a case, the hybrid solution may be wet applied, vertical slot meniscus coated, or otherwise provided to a desired thickness. Example coating techniques are described in, for example, U.S. Pat. No. 6,383,571, the entire contents of which are hereby incorporated herein by reference. In certain example embodiments, however, it may be desirable to provide a more viscous hybrid laminate (e.g., inorganic and/or other materials included in an organic binder such as EVA, silicones, aramids, etc.) that can be extruded, for example. A more viscous hybrid laminate may be advantageous in terms of a "cleaner" or "less messy" application.

The coated hybrid polymer or laminate is dried and/or cured. The drying and/or curing may help to remove solvents and water, leaving more inorganic material than organic material in certain example embodiments. The drying may take place at a first elevated temperature of less than about 250 degrees C., whereas the curing may take place at a second elevated temperature of greater than or equal to about 300 degrees C. Certain example embodiments may include one or both of drying and curing at these and/or any other suitable temperature.

Thus, in summarizing these example basic formulation, cross-linking, and curing steps, it will be appreciated that a chelated Ti-based precursor is brought into contact with a resin binder; the resin binder and the chelated Ti-based precursor are cross-linked; the solvent is evaporated through a heating process, and the cured film is adhered to a substrate (e.g., a film, hard surface, glass, etc.). In so doing, either (a) the organic-inorganic hybrid solution is wet applied on the substrate over the at least one LED, or (b) the organic-inorganic hybrid solution is introduced into a carrier medium and then the carrier medium is extruded onto the substrate over the at least one LED. The organic-inorganic hybrid solution is cured once disposed on the substrate, e.g., in forming the coating.

The rheological property of the matrix preferably is such that it can be dispensed either by zone casting or a slot meniscus coating over large areas of glass, and rapidly cured, e.g., by heat and/or UV exposure. When cured, it may help to effectively index match to the light emitting layers. In some cases, this portion of the OCLS may be 10-100 um in thickness. The smoothness of this layer preferably is on the order of the smoothness of glass and has an RMS roughness of less than or equal to 1.0 nm and more preferably of less than or equal to about 0.5 nm.

One of the routes for the matrix implementation is the use of glassy polymeric monomer to which titanium, hafnium, and/or zirconium oxo-clusters are added. When polymerization of the monomer is done in the presence of 10-30% by weight of $Zr_4O_2(OMc)_{12}$, for example, a clear and high index film is produced with high flexural strength and extremely good adhesion to the glass substrate. The use of an appropriate surfactant and coupling agent may assist in slot dispensing uniformity. The organic surface of $Ti_{16}O_{16}(OEt)_{32}$ cluster can be selectively modified by alcoholysis. This gives rise to new functional clusters, $Ti_{16}O_{16}(OEt)_{32-x}(OR)x$, where R can be a methacrylate or styrene and x is the number of modified alkoxy ranging anywhere from 4 to 16 depending, for example, on the pH.

The resulting matrix thus combines advantages of polymers (e.g., processability, flexural strength, etc.) and those of inorganic building blocks (such as, for example, high refractive index in the case of the transition alkaloids and chemical inertness, thermal and environmental stability, etc.). The index matching layer (imL) alone has good out-coupling efficiencies for incidence angles near zero and is also angle dependent.

The matrix layer core may include generally spherical scatterers that preferably are dispensed in such a manner that they are not clumped together. The Zeta potential of the scatterer colloid used preferably is high for good stability of the system, and sometimes is even greater than 70 mV. As is known, the Zeta potential refers to electro-kinetic potential in colloidal systems. Zeta potential is the potential difference between the dispersion medium and the stationary layer of fluid attached to the dispersed particle. Those skilled in the art generally consider a value of 25 mV as the value that separates low-charged surfaces from highly-charged surfaces. It is noted that the Zeta potential value sometimes is related to the stability of the colloidal dispersion, e.g., such that high values indicate greater stability, etc. These values also help ensures that the scatterer filling density is in a range of values such that the spheres are mono-dispersed with an inter-particle distance d of about 3 sphere-diameters (or 6 r). If this condition is met, then their separation is sufficiently large so that contribution of secondary waves to the field exciting each particle is much smaller that the external field.

As will be appreciated from the above, in certain example scenarios, the index matching out-coupling efficiency (>1) is boosted by a Mie-like scattering efficiency greater than one. The matrix containing the scatterers is itself a high index inorganic chelate. The scatterers are prepared, e.g., so that they comprise one or more materials. For instance, scatterers may have a concentric composition that increases scattering in some cases. The relative refractive index m, size r, and concentration of the scatterers ($1/s^3$) are chosen so that they help improve total integrated light out-coupled from the devices.

Although certain example embodiments have been described in connection with inorganic LEDs (ILEDS), it will be appreciated that the techniques described herein may be used in connection with other types of light emitting diodes including, for example, organic light emitting diodes (OLEDs), polymer light emitting diodes (PLEDs), and/or other lighting systems, etc.

Further details regarding OCLS systems can be found in, for example, U.S. application Ser. No. 13/488,779, filed on Jun. 5, 2012, which is hereby incorporated herein by reference.

It will be appreciated from the above that certain example embodiments relate to a laminable and conformable medium that carries electronic components, including LEDs. The topology of the circuit includes a distributed mixture of rigid and flexible parts, packaging, and interconnections. In the case of LEDs for lighting or signage, such a circuitry arrangement allows for molded elastic circuits capable of being deployed over relatively large areas of planar or curved glass. Of course, the techniques disclosed herein may be used in connection with other applications including, for example, applications that use LEDs as potential replacements for existing infrastructures in lighting systems used in residential, commercial, as well as mobile systems; display or signage devices; etc.

Glass substrates are advantageous for several reasons. For example, the scratch resistance and flexural strength of glass, coupled with its ability to be chemically tempered and have an optical surface finish that is able to sustain a silver mirror over long periods of operation is an advantage (e.g., over some plastic materials). Glass generally is not susceptible to yellowing from UV and can sustain high operational temperature for phosphor coating heat treatment for crystallization. The expansion coefficient of glass is also mush less than most plastics and consequently bonding of the PCB to the glass can be done with a high tolerance to expansion effects for a large array, such as may be involved in a luminaire or the like.

It is noted that the glass substrates of certain example embodiments may be chemically and/or thermally strengthened or tempered, e.g., to meet safety codes. The terms "heat treatment" and "heat treating" as used herein mean heating the article to a temperature sufficient to achieve thermal tempering and/or heat strengthening of the glass inclusive article. This definition includes, for example, heating a coated article in an oven or furnace at a temperature of at least about 550 degrees C., more preferably at least about 580 degrees C., more preferably at least about 600 degrees C., more preferably at least about 620 degrees C., and most preferably at least about 650 degrees C. for a sufficient period to allow tempering and/or heat strengthening. This may be for at least about two minutes, or up to about 10 minutes, in certain example embodiments.

As used herein, the terms "on," "supported by," and the like should not be interpreted to mean that two elements are directly adjacent to one another unless explicitly stated. In other words, a first layer may be said to be "on" or "supported by" a second layer, even if there are one or more layers there between.

Certain example embodiments relate to a method of making a window for a vehicle. A deformable backbone supporting a plurality of LED devices is provided, with the LED devices being connected to one another via flexible wires. The deformable backbone with the LED devices thereon is positioned between first and second glass substrates. The first and second substrates are laminated together with the deformable backbone therebetween. The backbone, when laminated between first and second substrates, has a shape selected to match an angle at which the windshield is to be disposed in the vehicle and so that the LED devices, when powered, emit light primarily in a direction parallel to a surface on which the vehicle is located.

In addition to the features of the previous paragraph, in certain example embodiments, the plurality of LED devices may be provided as a part of a Center High Mounted Stop Lamp (CHMSL), the CHMSL being controllable by a controller remote the LED devices.

In addition to the features of either of the two previous paragraphs, in certain example embodiments, the first laminating material may comprise PVB.

In addition to the features of any of the three previous paragraphs, in certain example embodiments, the backbone may be formed from PET, polyimide, polyamide, and/or PMMA.

In addition to the features of any of the four previous paragraphs, in certain example embodiments, the backbone may shaped so as to have a plurality of steps, with each said step supporting at least one of said LED devices. In some such cases, the backbone may be formed by cutting a single sheet of laminating material into complementary first and second stepped portions. In addition to the features of any of the four previous paragraphs, in certain example embodiments, the backbone may have a substantially sinusoidal shape.

In addition to the features of any of the five previous paragraphs, in certain example embodiments, an optical out-coupling layer stack (OCLS) system may be provided over the LED devices, with the OCLS system optionally comprising an isotropic layer matrix including an organometallic chelate hybrid material and a matrix core including dispersed scatterers.

In addition to the features of the previous paragraph, in certain example embodiments, the dispersed scatterers may have a Mie-like scattering efficiency of greater than 1, potentially leading to an index matching out-coupling efficiency for the OCLS of greater than 1.

In addition to the features of either of the two previous paragraphs, in certain example embodiments, a filling density of the scatterers may be in a range of values such that the scatterers are mono-dispersed with an inter-particle distance d of about 3 diameters or major distances.

In addition to the features of the previous paragraph, in certain example embodiments, each scatterer may be located in the far field of its nearest neighbor and there may be no systematic phase relationship, except potentially for coherent exact forward scattering.

In addition to the features of any of the nine previous paragraphs, in certain example embodiments, a multilayer low-emissivity (low-E) coating may be disposed on the first and/or second substrate.

In addition to the features of the previous paragraph, in certain example embodiments, the LED devices may be chained together to form an array; at least some leads may extend from the array and may be in direct electrical contact with the low-E coating; and the LED devices may be addressable and/or powerable via the low-E coating.

In addition to the features of any of the 11 previous paragraphs, in certain example embodiments, the LED devices may be chained together to form an array that operates at a temperature of no greater than 150 degrees C.

Certain example embodiments relate to a method of making an electronic device. A flexible sheet supporting a plurality of a bare die LEDs is provided, with the LEDs being connected to one another via flexible wires to form an LED array, and with the LEDs in the array being individually addressable and powerable via remotely located control circuitry. An optical out-coupling layer stack (OCLS) system is disposed over the LEDs, with the OCLS system comprising an isotropic layer matrix including an organometallic chelate hybrid material and a matrix core including dispersed scatterers. The flexible sheet is deformed, with the LED array thereon, such that is shaped to match a desired application.

In addition to the features of the previous paragraph, in certain example embodiments, the flexible sheet may be formed from PET, polyimide, polyamide, and/or PMMA.

In addition to the features of either of the two previous paragraphs, in certain example embodiments, the flexible sheet may be shaped so as to have a plurality of steps, with each said step supporting at least one of said LEDs. In addition to the features of either of the two previous paragraphs, in certain example embodiments, the flexible sheet may be shaped so as to have a substantially sinusoidal shape.

In addition to the features of any of the three previous paragraphs, in certain example embodiments, the flexible sheet may be shaped by providing a single stratum of laminating material, and cutting the single stratum of laminating material into first and second complementary pieces, the first piece having a desired pattern.

In addition to the features of any of the four previous paragraphs, in certain example embodiments, the flexible sheet with the LED array thereon may be embedded in a laminating material.

In addition to the features of the previous paragraph, in certain example embodiments, a plurality of cavities may be formed in the laminating material, with each said LED potentially being oriented in a respective cavity, and with each said cavity potentially being tapered along a depth thereof so as to increase in diameter or distance from a first end thereof wherein the respective LED is located to a second end thereof.

In addition to the features of the previous paragraph, in certain example embodiments, each said cavity may have a parabolic side wall when viewed in cross section.

In addition to the features of either of the two previous paragraphs, in certain example embodiments, each said cavity may have a reflective coating disposed thereon.

In addition to the features of the previous paragraph, in certain example embodiments, the reflective coating may comprise a thin film layer including silver and an optional protective layer disposed on the thin film layer including silver.

In addition to the features of any of the four previous paragraphs, in certain example embodiments, light exiting the second end of each said cavity may be substantially collimated so as to allow for only 10-30 degrees of distribution.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of making a window for a vehicle, the method comprising:
   providing a polymer-based deformable backbone supporting a plurality of LED devices, the LED devices being connected to one another via flexible wires;
   positioning the deformable polymer-based backbone with the LED devices thereon between first and second glass substrates; and
   wherein the backbone is shaped so as to comprise a plurality of steps that support respective LED devices of the plurality of LED devices;
   providing an optical coupling material proximate the steps so as to be located between the steps and laminating material;
   laminating together the first and second substrates with the deformable backbone therebetween using the laminating material;
   wherein the backbone, when laminated between first and second substrates, has a shape so that the LED devices are angled relative to the first and second substrates so that light to be emitted from the LED devices is emitted at an angle that is neither perpendicular nor parallel to an elongated direction of the first and second substrates, with the shape configured to match an angle at which the window is to be disposed in the vehicle and so that the LED devices, when powered, emit light primarily in a direction parallel to a surface on which the vehicle is located, and wherein the window is a rear windshield of the vehicle.

2. The method of claim 1, wherein the plurality of LED devices are provided as a part of a Center High Mounted Stop Lamp (CHMSL), the CHMSL being controllable by a controller remote the LED devices.

3. The method of claim 1, wherein the laminating material between the first and second substrates comprises PVB.

4. The method of claim 1, wherein the backbone is formed from PET, polyimide, polyamide, and/or PMMA.

5. The method of claim 1, wherein the backbone is formed by cutting a single sheet of laminating material into complementary first and second stepped portions.

6. The method of claim 1, wherein the optical coupling material comprises an isotropic layer matrix including an organo-metallic chelate hybrid material and a matrix core including dispersed scatterers.

7. The method of claim 6, wherein the dispersed scatterers have a Mie-like scattering efficiency of greater than 1, leading to an index matching out-coupling efficiency for the OCLS of greater than 1.

8. The method of claim 6, wherein a filling density of the scatterers is in a range of values such that the scatterers are mono-dispersed with an inter-particle distance d of about 3 diameters or major distances.

9. The method of claim 8, wherein each scatterer is located in the far field of its nearest neighbor and there is no systematic phase relationship, except for coherent exact forward scattering.

10. The method of claim 1, further comprising disposing a multilayer low-emissivity (low-E) coating on the first and/or second substrate so as to contact the laminating material.

11. The method of claim 10, wherein:
   the LED devices are chained together to form an array;
   at least some leads extend from the array and are in direct electrical contact with the low-E coating; and
   the LED devices are addressable and/or powerable via the low-E coating.

12. The method of claim 1, wherein the LED devices are chained together to form an array that operates at a temperature of no greater than 150 degrees C.

13. The method of claim 1, wherein prior to the first and second substrates being laminated together, the deformable backbone is shaped by providing a single stratum of laminating material, and cutting the single stratum of laminating material into first and second complementary pieces, the first piece having a desired pattern.

14. The method of claim 1, wherein the deformable backbone with the LED devices thereon is embedded in a laminating material prior to the first and second substrates being laminated together.

15. The method of claim 14, wherein a plurality of cavities are formed in the laminating material, each said LED device being oriented in a respective cavity, each said cavity being tapered along a depth thereof so as to increase in diameter or distance from a first end thereof wherein the respective LED is located to a second end thereof.

16. The method of claim 15, wherein each said cavity has a parabolic side wall when viewed in cross section.

17. The method of claim 15, wherein each said cavity has a reflective coating disposed thereon.

18. The method of claim 17, wherein the reflective coating comprises a thin film layer including silver and a protective layer disposed on the thin film layer including silver.

19. The method of claim 17, wherein light exiting the second end of each said cavity is substantially collimated so as to allow for only 10-30 degrees of distribution.

20. The method of claim 1, wherein the LED devices are bare die LEDs, the LEDs being connected to one another via the flexible wires to form an LED array.

21. The method of claim 20, wherein the LEDs in the array are individually addressable and powerable via remotely located control circuitry.

22. A method of making a vehicle including a window, the method comprising building a window made in accordance with the method of claim 1 into the vehicle.

23. A method of making a window for a vehicle, the method comprising:

providing a polymer-based deformable backbone supporting a plurality of LED devices, the LED devices being connected to one another via flexible wires;

positioning the deformable polymer-based backbone with the LED devices thereon between first and second glass substrates; and wherein the backbone is shaped so as to comprise a plurality of steps that support respective LED devices of the plurality of LED devices;

providing an optical coupling material proximate the steps so as to be located between the steps and laminating material;

laminating together the first and second substrates with the deformable backbone therebetween using the laminating material;

wherein the backbone, when laminated between first and second substrates, has a shape so that the LED devices are angled relative to the first and second substrates so that light to be emitted from the LED devices is emitted at an angle that is neither perpendicular nor parallel to an elongated direction of the first and second substrates, with the shape configured to match an angle at which the window is to be disposed in the vehicle and so that the LED devices, when powered, emit light primarily in a direction parallel to a surface on which the vehicle is located.

* * * * *